(12) United States Patent
Chen et al.

(10) Patent No.: US 9,308,529 B2
(45) Date of Patent: Apr. 12, 2016

(54) METHOD OF USING MICROFLUIDIC CHIP FOR NUCLEIC ACID HYBRIDIZATION

(71) Applicants: Jau-Der Chen, Keelung (TW); Pei-Tai Chen, Keelung (TW)

(72) Inventors: Jau-Der Chen, Keelung (TW); Pei-Tai Chen, Keelung (TW)

( * ) Notice: Subject to any disclaimer, the term of this patent is extended or adjusted under 35 U.S.C. 154(b) by 0 days.

(21) Appl. No.: 14/259,974

(22) Filed: Apr. 23, 2014

(65) Prior Publication Data

US 2015/0086983 A1    Mar. 26, 2015

(30) Foreign Application Priority Data

Sep. 23, 2013  (TW) .............................. 102134162 A (51) Int. Cl.
| | |
|---|---|
| *C12Q 1/68* | (2006.01) |
| *C12M 1/00* | (2006.01) |
| *C12M 1/34* | (2006.01) |
| *C07H 21/02* | (2006.01) |
| *C07H 21/04* | (2006.01) |
| *C40B 30/04* | (2006.01) |
| *G01N 15/06* | (2006.01) |
| *B01L 3/00* | (2006.01) |
| *B01J 19/00* | (2006.01) |

(52) U.S. Cl.
CPC ............... *B01L 3/5027* (2013.01); *B01J 19/00* (2013.01); *B01J 2219/00641* (2013.01); *B01J 2219/00722* (2013.01); *B01L 2200/0621* (2013.01); *B01L 2200/0636* (2013.01); *B01L 2300/0681* (2013.01); *B01L 2300/0816* (2013.01); *B01L 2300/0858* (2013.01); *B01L 2300/0861* (2013.01); *B01L 2400/0487* (2013.01)

(58) Field of Classification Search
CPC .......... C12Q 1/68; C40B 30/04; C07H 21/02; B01L 3/5027
USPC .................... 435/6.1, 283.1, 287.2; 422/68.1; 536/23.1, 24.3; 506/9, 16
See application file for complete search history.

(56) References Cited

U.S. PATENT DOCUMENTS

| | | | | |
|---|---|---|---|---|
| 4,978,614 | A  * | 12/1990 | Bronstein | ........................ 435/21 |
| 6,059,561 | A  * | 5/2000 | Becker | ............................... 431/6 |
| 6,309,824 | B1 * | 10/2001 | Drmanac | ...................... 435/6.11 |
| 8,148,066 | B2 * | 4/2012 | Chang et al. | .................... 435/6.1 |
| 2003/0118998 | A1* | 6/2003 | Dean | .................... C12Q 1/6806 435/6.18 |

OTHER PUBLICATIONS

Liu et al, Comparative study on the interaction of DNA with three different kinds of surfactants and the formation of multilayer films, 2007, Bioelectrochemistry, 70, 301-307.*

* cited by examiner

*Primary Examiner* — Narayan Bhat
(74) *Attorney, Agent, or Firm* — WPAT, P.C.; Anthony King (57) ABSTRACT

The present invention relates to method of using a microfluidic chip for rapid nucleic acid hybridization, comprising: activating a porous substrate with positive charges; injecting a mixed solution of a test nucleic acid and a nucleic acid probe into the microfluidic chip for maintaining the test nucleic acid hybridized to the nucleic acid probe being absorbed to the periphery of the substrate; continuously washing the microfluidic chip with an anionic surfactant; and detecting the hybridization signals on the substrate after washing for a predetermined time; wherein the activation of the substrate with positive charges allows the test nucleic acid hybridized to the nucleic acid probe to form a micelle during washing and the diffusion of such from the periphery toward the center of the substrate to accelerate. Thus, it is possible to accomplish detection in a very short time for application of specific DNA complementary hybridization.

7 Claims, 13 Drawing Sheets

METHOD OF USING MICROFLUIDIC CHIP FOR NUCLEIC ACID HYBRIDIZATION

CROSS-REFERENCES TO RELATED APPLICATIONS

This application claims priority to Taiwan Patent Application No. 102134162 filed on 23 Sep. 2013. All disclosure of which is incorporated herein by reference in its entirety.

BACKGROUND OF THE INVENTION

1. Field of the Invention

The present invention is related to a method for nucleic acid hybridization, particularly, the method of using microfluidic chip for nucleic acid hybridization.

2. The Prior Arts

Regarding clinical diagnoses and treatment, rapid identification of causative pathogens can effectively improve clinical outcomes. The conventional identification of bacteria depends on the colonies growth on the cultured medium and examining their morphological and the expressed biochemical characters. The whole process costs around 4 to 5 days.

Using specific nucleic acid as probe to analyze the test nucleic acid via hybridization is one of the commonly used methods for verifying whether or not the DNA of the specimen contains the desired gene(s) or gene segment. Known analysis of hybridization comprises the following steps: primarily, utilizing blot or blotting techniques to transfer the test nucleic acid to a substrate, for example, a membrane; then, proceeding the hybridization using nucleic acid as probe with specificity; finally, presenting the result of hybridization by methods such as color reaction, luminescence, or radioactive emission according to the marker molecule of the nucleic acid probe.

For the known blotting technique, the test nucleic acid was placed on the surface of a membrane in the form of droplet; for the purpose of eliminating the possibility of nucleic acid being washed away during the wash step after the hybridization, heating or ultraviolet light exposure was applied to ensure that the test nucleic acid crosslink firmly on the surface of the membrane. If the membrane was placed inside a microfluidic chip, the above heating process generates heat and is likely to cause slight twists of the microfluidic channels resulting in leak of fluid. Slow heat reduction is also a drawback which leads to a longer time required for the crosslinking of the test nucleic acid. Besides, like the test nucleic acid, diffusion of nucleic acids that served as probes can only happen on the surface of the membrane which allows probes to move in Brownian motion and search for complementary nucleic acids. Therefore, known nucleic acid hybridization methods undergo multiple operative procedures and requires reaction time of ten hours or above. Hence, for examinations that require immediate results, known nucleic acid hybridization methods are incapable of completing the process in a short period of time. Besides, it is also very inefficient if a large amount of time and agent were still to be spent on simple nucleic acid qualifying examinations.

Prevention and accurate diagnosis are important parts of public health and disease control. Moreover, accurate diagnosis is the foundation of effective treatment. Method or device of nucleic acid hybridization that is able to simplify the step and time of nucleic acid matching as well as eliminate background interfering signals can effectively reduce the time and cost of both normal or large scale batch examinations. However, currently the market still lacks an accurate, cost-effective, easy-to-store, and highly efficient nucleic acid hybridization technique.

SUMMARY OF THE INVENTION

As a result, the present invention provides a method of using microfluidic chip for rapid nucleic acid hybridization, comprising providing the microfluidic chip having a hybridization region installed with a porous substrate, an interstice being defined between the porous substrate and a sidewall of the hybridization region and surrounding the periphery of the porous substrate, the hybridization region being connected to at least one inlet and at least one outlet, respectively; the method includes the following steps: (a) mixing a test nucleic acid and a nucleic acid probe to form a mixed solution, injecting the mixed solution into the microfluidic chip via at least one inlet to fill the interstice between the porous substrate and the sidewall of the hybridization region for maintaining the test nucleic acid that hybridized to the nucleic acid probe being absorbed to the periphery of the porous substrate; (b) continuously injecting of an anionic surfactant, the anionic surfactant entering the interstice surrounding the periphery of the porous substrate via at least one inlet and then flowing through the porous substrate from the periphery of the porous substrate toward the center of the porous substrate, the anionic surfactant being finally discharged via at least one outlet; and (c) detecting where there is specific hybridization of the test nucleic acid with the nucleic acid probe on the porous substrate after washing with the anionic surfactant for a predetermined time; wherein injecting a buffer solution into the microfluidic chip prior to step (a) to activate the porous substrate with positive charges, to allow the test nucleic acid hybridized with nucleic acid probe to form a micelle during washing with the anionic surfactant elution in step (c) and the accelerated diffusion of the test nucleic acid hybridized with nucleic acid probe from the periphery of the porous substrate toward the center of the porous substrate in step (b). The method of the present invention can proceed in room temperature without the need of any heating procedure.

One embodiment of the present invention, hydrophobic tails of the anionic surfactant coats the test nucleic acid and the nucleic acid probe to form a micelle, while hydrophilic head groups of the anionic surfactant having negative charges couples to the positive charges on the porous substrate. Continuous injection of anionic surfactant in a given amount of time thus leads to competition for the positive charge on the porous between the hydrophilic head groups of the anionic surfactant having negative charges and the micelle. The concentration of anionic surfactant regulates the predetermined time in step (c).

The anionic surfactant is sodium dodecyl sulfate or sarcosine, wherein when the concentration of sodium dodecyl sulfate is in a range from 0.1% to 0.3% (w/v), the predetermined time is within 400 seconds; when the concentration of sarcosine is in a range from 0.3% to 0.4% (w/v), the predetermined time is within 400 seconds. In another embodiment of the present invention, a salt solution with low concentration can be selectively added while injecting the anionic surfactant in step (c), for example, the standard sodium citrate, wherein the concentration of the standard sodium citrate is a dilution from 0.001× to 5×. In addition, the nucleic acid probe is labeled with a fluorescence marker, and the buffer solution in the method of the present invention is a TE buffer solution.

By injecting a buffer solution prior to step (a), the porous substrate as a whole can be activated with positive charges. After injecting the mixed solution of the test nucleic acid and the marker-labeled nucleic acid probe, continuously injecting of an anionic surfactant in step (b) allows the test nucleic acid to hybridize with the marker-labeled nucleic acid probe to form a micelle and establish accelerated diffusion from the periphery to the center of the porous substrate. On the other hand, unhybridized test macromolecular nucleic acids cannot be displayed on the porous substrate since they do not bind with the marker-labeled probe. Unhybridized marker-labeled nucleic acid probes are washed away from the porous substrate by anionic surfactant or a selectively added salt solution with low concentration, for example, standard sodium citrate, while a small proportion of marker-labeled nucleic acid probe remains at the periphery of the porous substrate. Hence, by the movement that differs completely from known techniques, the present invention is capable of identifying bacterial pathogens via nucleic acid probe detection at room temperature in a very short time.

The present invention is further explained in the following embodiment illustration and examples. Those examples below should not, however, be considered to limit the scope of the invention, and it is contemplated that modifications will readily occur to those skilled in the art, which modifications will be within the spirit of the invention and scope of the appended claims.

DETAILED DESCRIPTION OF THE PREFERRED EMBODIMENT

Definition

As used herein, the terms "polynucleotide", "nucleic acid", "nucleic acid molecule", "nucleic acid sequence", "polynucleotide sequence", and "nucleotide sequence" are interchangeable to refer to polymeric forms of nucleotides of any length. The polynucleotides can comprise deoxyribonucleotides, ribonucleotides, and/or their analogs or derivatives. Nucleotide sequences shown herein are listed in the 5' to 3' direction.

A probe is "specific for" a particular macromolecular nucleic acid when the probe binds to or interact with the particular macromolecular nucleic acid but does not bind to or interact significantly with other macromolecular nucleic acids.

Materials and Method

Figure 1:
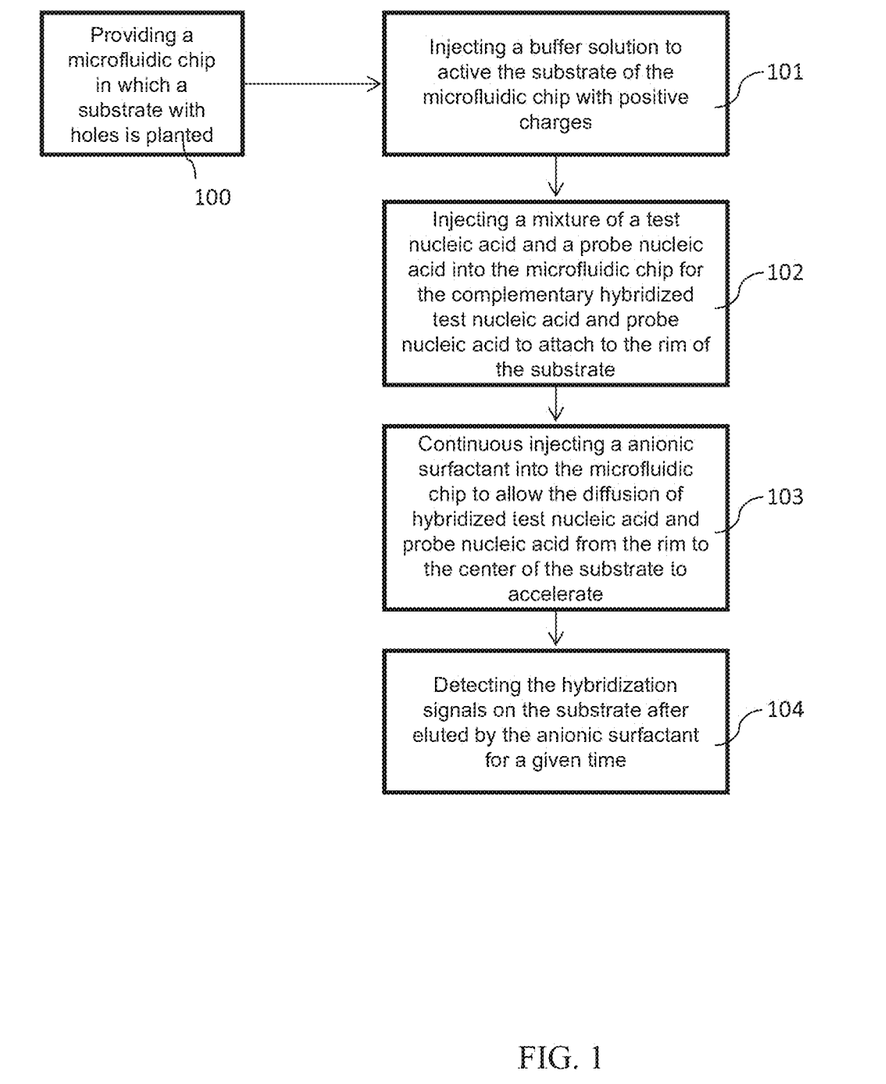
FIG. 1, flow chart for the method of the embodiment of the present invention.

Please refer to FIG. 1, flow chart for the method of the embodiment of the present invention. The method of using microfluidic chip for nucleic acid hybridization of the present invention includes, providing a microfluidic chip in which a substrate with holes is planted (step 100) and injecting a buffer solution to active the substrate of the microfluidic chip with positive charges (step 101); injecting a mixture of a test nucleic acid and a nucleic acid probe into the microfluidic chip for the complementary hybridized test nucleic acid and nucleic acid probe to attach to the periphery of the substrate (step 102); then, continuously injecting an anionic surfactant into the microfluidic chip to allow the accelerated diffusion the test nucleic acid hybridized with the nucleic acid probe from the periphery of the porous substrate toward the center of the porous substrate (step 103); finally, detecting the hybridization signals on the porous substrate after washing with the anionic surfactant for a predetermined time.

Upon detecting hybridization signals, a method of detection can depend on the marker on the probe. Besides various available kits in the market which can be used for colorization or other reaction for displaying the result, according to the disclosure of the specification of the present invention, one skilled in the art can appreciate the fact that preparation of the nucleic acid probe can be detected using fluorescence such as HEX, Cy3, and Cy5. The above detection method is only exemplary embodiment; other methods can also be utilized including but not limit to photoelectric detections, such as impedance detection, capacitance detection, resistance detection, electrochemistry detection; mass detection or weight detection.

Figure 2:
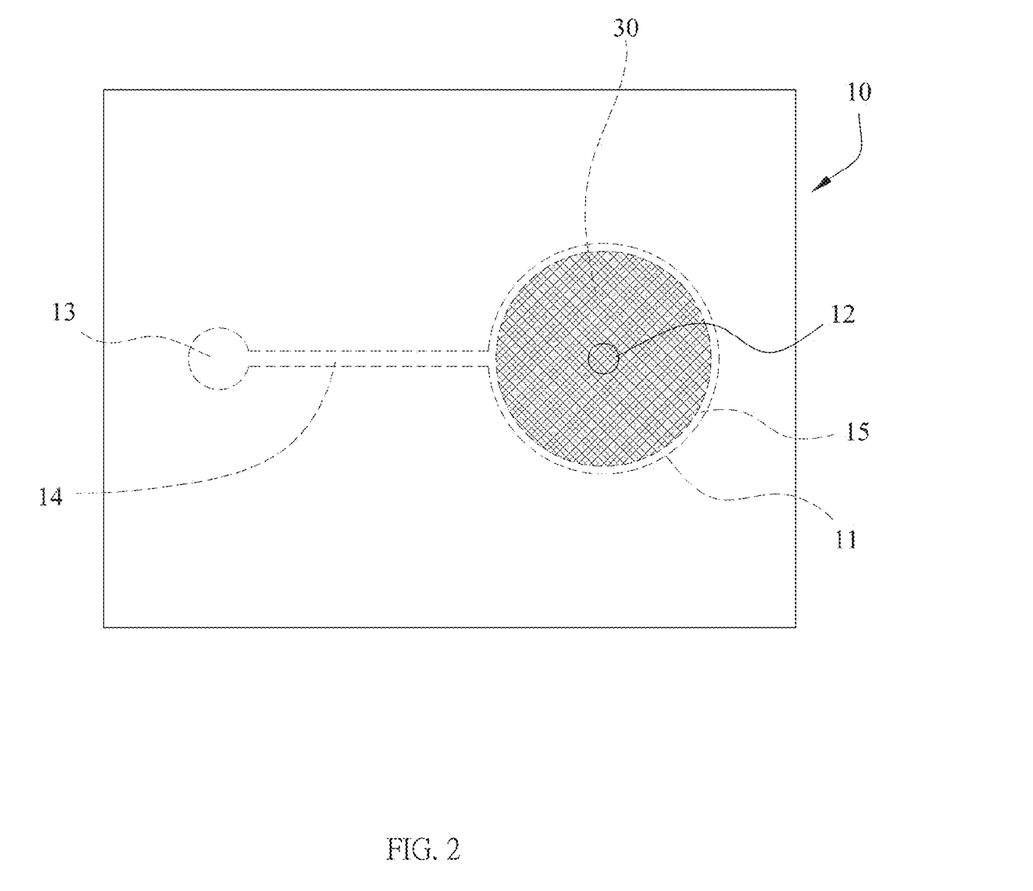
FIG. 2, top view of the microfluidic chip of the present invention.

In the embodiment of the present invention, a microfluidic chip as showed in FIG. 2 was prepared by stacking an upper substrate of polymethyl methacrylate (PMMA) 10 and a lower substrate of PMMA 20. A disc-shaped and hollow-shaped hybridization region 11 was planted between the upper substrate 10 and the lower substrate 20, and a 6 mm diameter round nylon membrane (substrate 30) having pores with 0.2 mm diameter was installed in the hybridization region 11. An interstice 15 of 0.1 mm was defined between the nylon membrane and a sidewall of the hybridization region 11 allowing microfluid to flow through the fiber of the nylon membrane. An outlet 12 and an inlet 13 were fabricated according to known microfluidic chip system and were connected to communicating tubes and pump. A first microfluidic channel 14 was connected to the inlet 13 and the hybridization region 11 for the delivery of solution.

For the preparation of the solution of the test DNA and the solution of nucleic acid probe to proceed hybridization, 50 µL of *Edwardsiella trada* (BCRC 16702, BCRC16711) were used as experimental groups, respectively, and *Escherichia coli* (DH5α) was used as a control group, and were amplified for 35 cycles using PCR so as to express 16S rDNA. On the other hand, a nucleic acid probe with HEX marker (20 bp in length) that only complement with *E. tarda* 16S rDNA but not with *E. coli* 16S rDNA was prepared. 5 µL of the nucleic acid probe were added to each of the above 16S rDNA and were mixed to process base pairing, and then the mixture was heated to 94° C. for 5 minutes and was cooled down in room temperature. *Edwardsiella trada* PCR expressed 16S rDNA were bond to the periphery of the substrate and was confirmed by SYBR® Green I stain (Life Technologies Corporation). SYBR® Green I only emits weak background fluorescence in free state, however, upon binding to the minor groove of the double helix of DNA, the excited SYBR® Green I can produce very strong fluorescence; thus, the intensity of the fluorescence of SYBR® Green I is related to the quantity of test DNA and is suitable for monitoring the change in quantity of test DNA during PCR. The mixture of test DNA and SYBR® Green I is abbreviated to DNA/Sybr in the present invention.

50 μL of TE buffer solution were injected into the microfluidic chip at room temperature in a given flow speed, preferably 15 μL/min, to activate the substrate (for example: nylon membrane) in the hybridization region with positive charges, wherein the TE buffer solution was made by adding EDTA to a Tris buffer solution. Then, the above mixture of various combination of PCR amplified DNA/probe, such as test DNA/Sybr, probe/HEX, native DNA, denatured DNA, *E. tarda* BCRC16702 DNA/probe, *E. tarda* BCRC 16711 DNA/probe, and *E. coli* DH5α/probe, were prepared.

Figure 10:
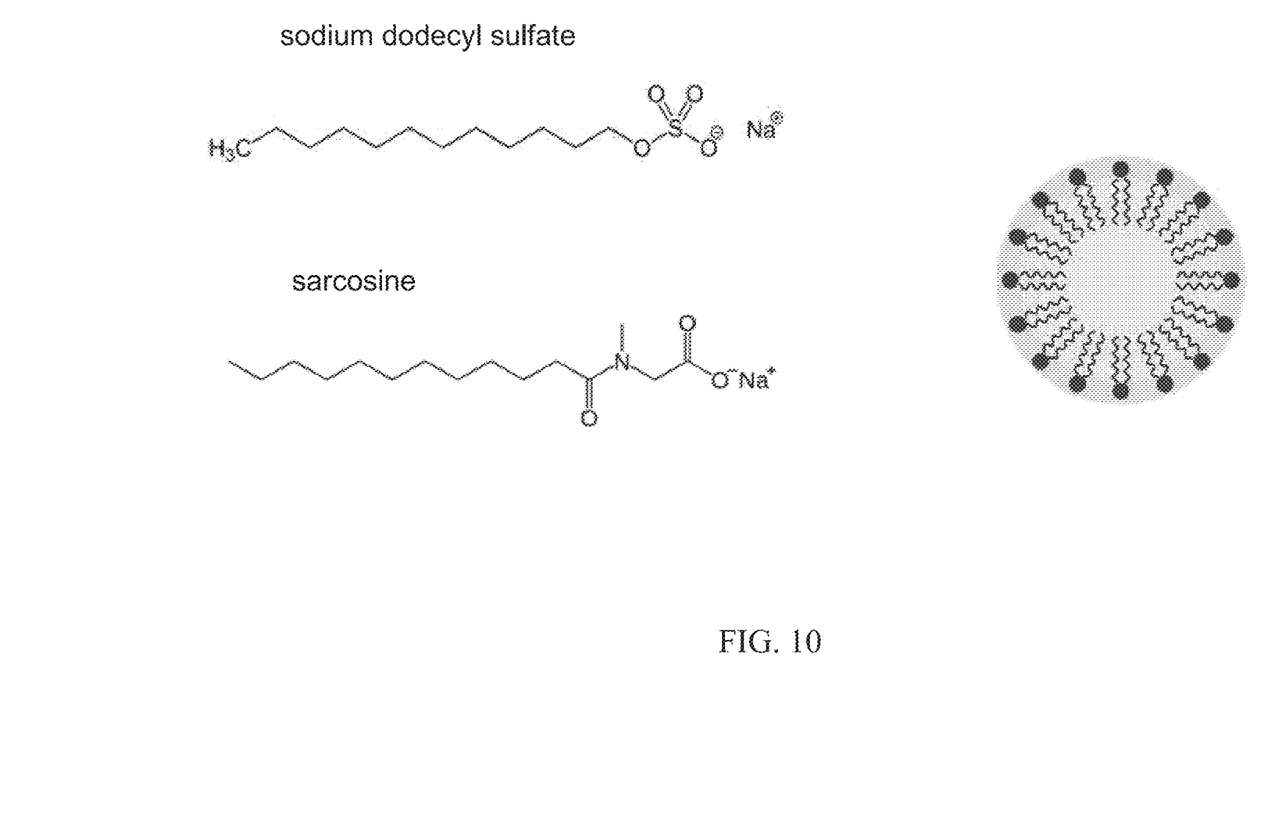
FIG. 10, illustration of a micelle formed by the anionic surfactant.

At room temperature, 20 μL of the above mixture were directly injected into the microfluidic chip via the inlet 13 and onto the positively charged substrate through the first microfluidic channel 14. The flow speed is, preferably, 50 μL/min. Then, the microfluidic chip was washed by using an anionic surfactant such as sodium dodecyl sulfate (SDS) or sarcosine whose structures are shown in FIG. 10. Unhybridized probes were eluted at, preferably, the flow speed of 50 μL/min. Unhybridized probes diffused from the periphery to the center of the substrate 30 and finally discharged from the outlet 12 which located at the same surfaces of the substrate 30 and the inlet 13. Since the test DNA that hybridized to probe formed a double helix structure and migrated rapidly to the center of the substrate by the use of an anionic surfactant, detection of the movement of the florescence-labeled probe was recorded using florescence microscopy images with the frequency of 1 image per 10 seconds and a total of 70 images were taken. The unhybridized nucleic acid probe would be washed away immediately and the unhybridized test DNA would not appear in the florescence images either due to the fact that they didn't bind to florescence-labeled probes. In another embodiment of the present invention, a mixture of an anionic surfactant and a salt solution with low concentration, for instance, standard sodium citrate (SSC) solution can also be used for elution. 20× diluted SSC including 3 M sodium chloride and 0.3 M sodium citrate (pH 7.0) was prepared. The present invention can accurately determine the result within 10 minutes, and preferably, within 10 to 400 seconds.

EXAMPLE 1

Analysis of Elution of Test Double Helix DNA/Syber and Probe/HEX Using SDS

Figure 3:
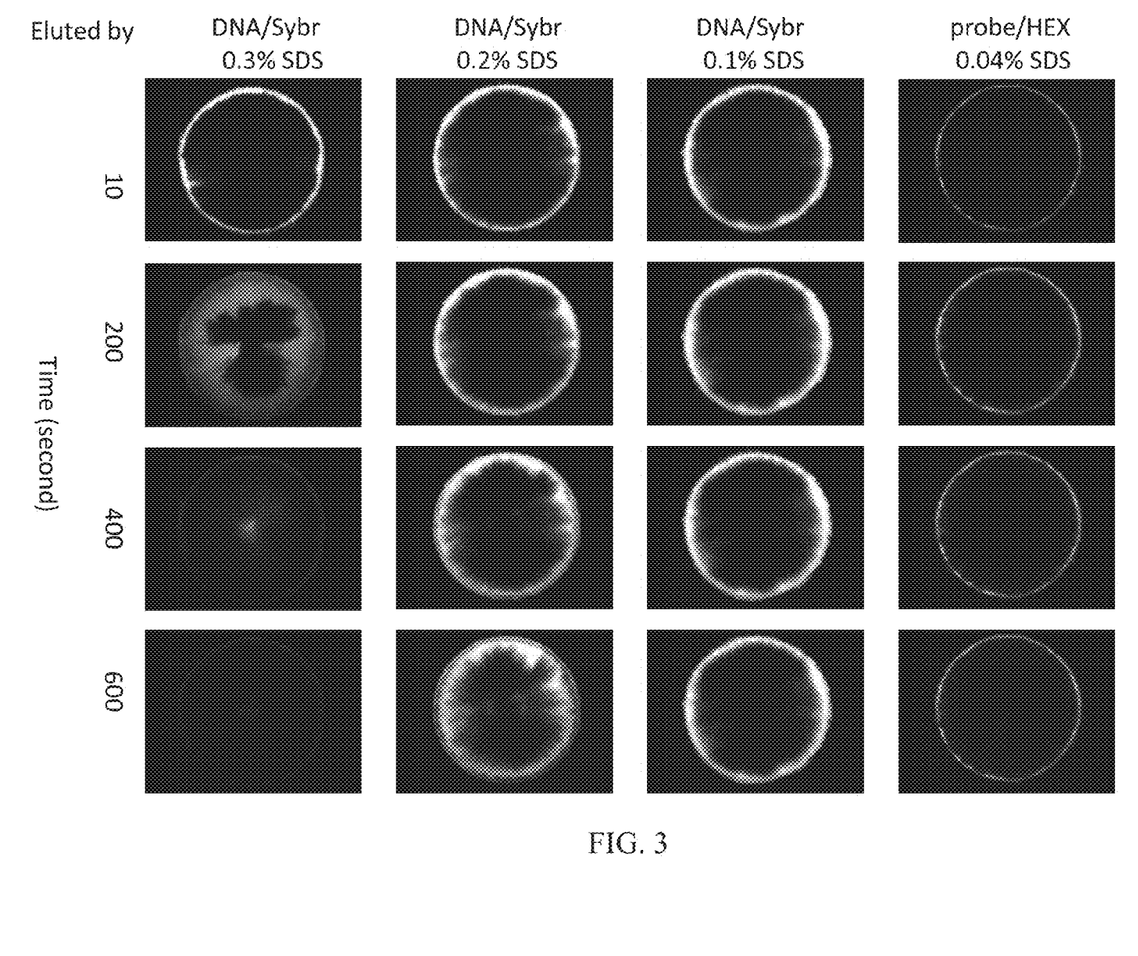
FIG. 3, result of eluting a test double-stranded DNA/Syber and probe/HEX by sodium dodecyl sulfate (SDS).

FIG. 3 clearly illustrates the results upon the mixture of test double helix DNA, which is bound to SYBR® Green I stain and abbreviated as DNA/Sybr, and the probe/HEX were injected, and different concentrations of SDS were used for elution. The concentrations of SDS are 0.04% (w/v), 0.1% (w/v), 0.2% (w/v), and 0.3% (w/v). As shown in FIG. 3, test macromolecular 16S rDNA (approximately 1540 bp in length) began to move towards the center of the substrate after eluting for 200 seconds using 0.1% (w/v) SDS; the test macromolecular DNA began to move significantly towards the center of the substrate after eluting for 400 seconds using 0.2% (w/v) SDS; almost all test macromolecular DNA move to the center of the substrate after eluting for 400 seconds using 0.3% (w/v) SDS. Meanwhile, small molecular probe/HEX were washed away immediately by the elution of 0.04% (w/v) SDS since they were not hybridized with the test DNA, whereas a few small molecular probe/HEX that cannot be washed away were trapped at the periphery of the substrate emitting a weak circle of florescence light. In another embodiment of the present invention, similar to those in FIG. 3 were observed while small molecular probe/HEX were being eluted by 0.01%-0.3% (w/v) SDS.

EXAMPLE 2

Figure 4:
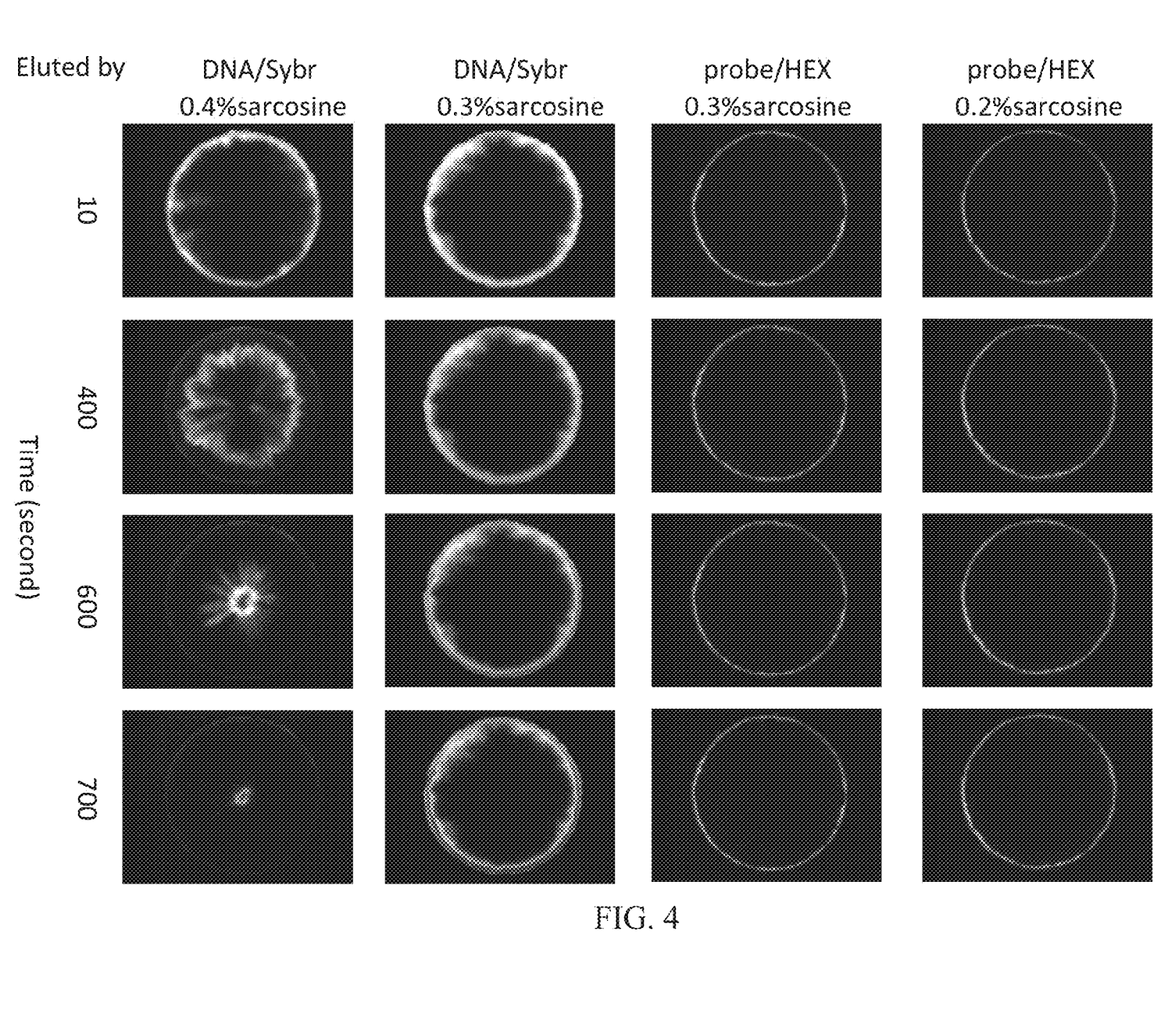
FIG. 4, result of eluting a test double-stranded DNA/Syber and probe/HEX by sacrosine.

Analysis of Elution of Test Double Helix DNA/Syber and Probe/HEX Using Sarcosine FIG. 4 clearly illustrates the results upon the mixture of test double helix DNA, which is bound to SYBR® Green I stain and abbreviated as DNA/Sybr, and the probe/HEX were injected and different concentrations of sarcosine were used for elution. The concentrations of sarcosine are 0.2% (w/v), 0.3% (w/v), and 0.4% (w/v). As shown in FIG. 4, a test macromolecular DNA began to move towards the center of the substrate after eluting for 600 seconds using 0.3% (w/v) sarcosine; the macromolecular DNA began to move significantly towards the center of the substrate after eluting for 400 seconds using 0.4% (w/v) sarcosine and almost all test macromolecular DNA were washed away and were discharged from the substrate of the chip via the outlet 12 after eluting for 600 seconds using 0.4% (w/v) sarcosine. On the other hand, small molecular probe/HEX were washed away immediately by the elution of 0.2% (w/v) or 0.3% (w/v) sarcosine since they were not hybridized with the test DNA, whereas a few small molecular probe/HEX that cannot be washed away were trapped at the periphery of the substrate emitting a weak circle of florescence light. In another embodiment of the present invention, similar to those in FIG. 4 were observed while small molecular probe/HEX were being eluted by 0.05%-0.4% (w/v) sarcosine.

EXAMPLE 3

Analysis of Elution of Probe/HEX Using a Mixture of SDS and SSC

Figure 5:
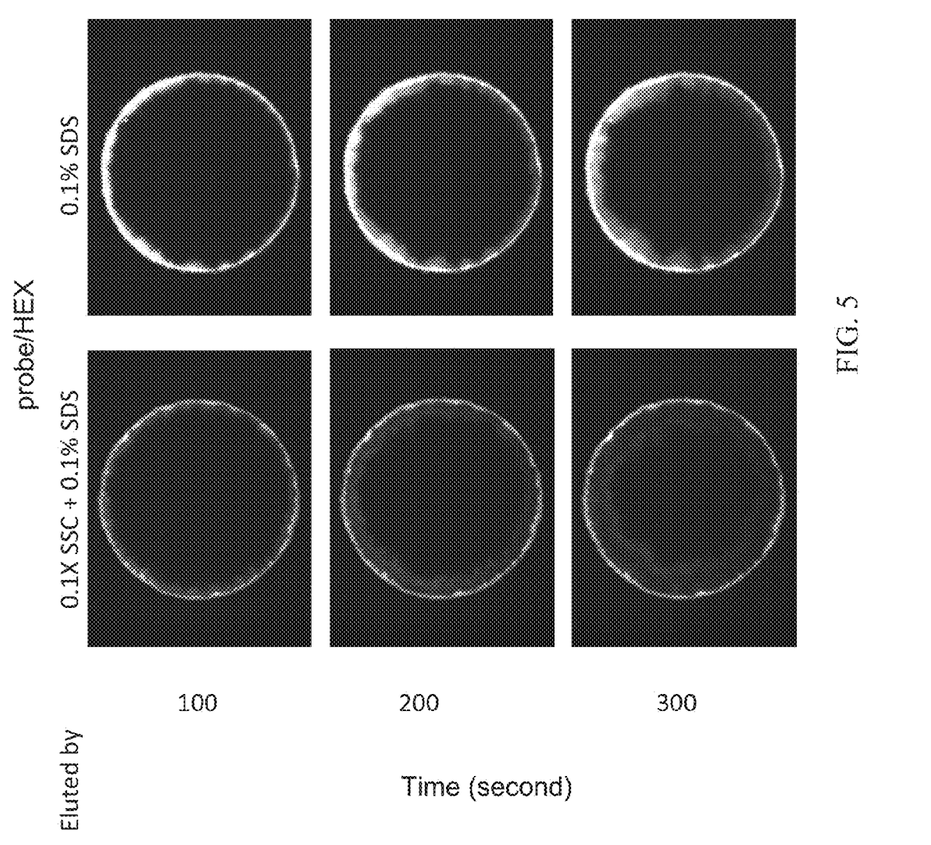
FIG. 5, result of eluting a probe/HEX by the mixture of SDS and standard sodium citrate (SSC).

FIG. 5 clearly illustrates the results upon probe/HEX were injected and solely 0.1% (w/v) SDS or a mixture of 0.1% (w/v) SDS and 0.1× SSC were used for elution. As shown in FIG. 5, during the process of elution using solely anionic surfactant, SDS, except a few immobile small molecular probes trapped in the substrate, free probes were coated by SDS to form micelles and migrated rapidly towards the center of the substrate. During the movement, the micelles coupled with the positive charges on the substrate and became immobile. The immobilization of micelles became significant from after 300 seconds since the florescence light gradually faded from the outside towards the inside of substrate. Comparing with the movement of probes during the elution by a mixture of SDS and 0.1× SSC, it was found that after 200 seconds, the Cl$^-$ and citrate$^-$ competed with the probe/DNA for the positive charges on the substrate, which effectively reduced the background florescence value.

EXAMPLE 4

Figure 6:
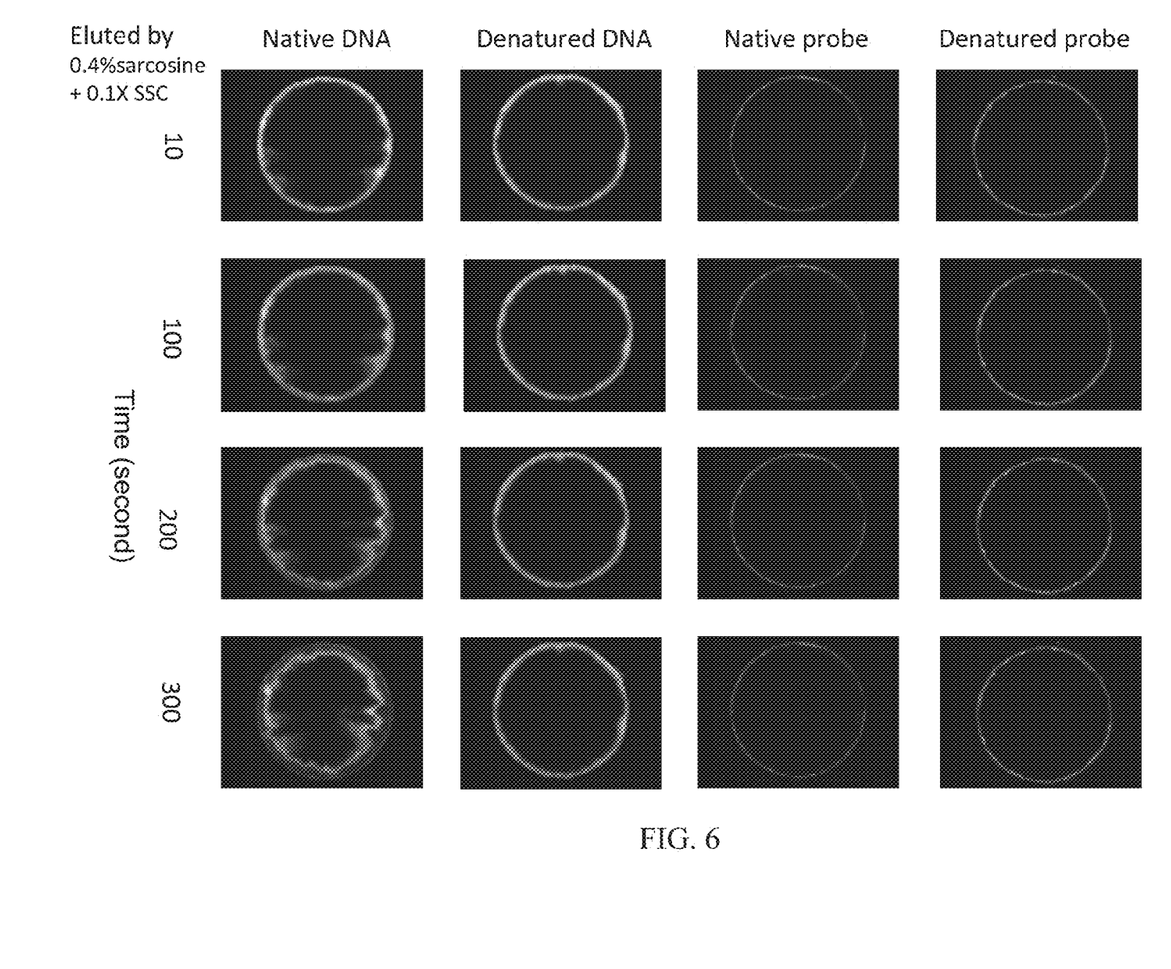
FIG. 6, result of eluting a native/denatured DNA and native/denatured probe by the mixture of sacrosine and SSC.

Analysis of Elution of Native/Denatured DNA and Native/Denatured Probe Using a Mixture of Sarcosine and SSC FIG. 6 clearly illustrates the results upon the mixtures of native DNA/Sybr, denatured DNA/Syber, native probe/HEX, and denatured probe/HEX were injected, respectively, and a mixture of 0.4% (w/v) sarcosine and 0.1× SSC was used for elution. Comparing the results of native DNA and denatured DNA being eluted on the substrate of the microfluidic chip, it was found that, when eluted by 0.1× SSC in combination with appropriate anionic surfactant concentrations, native DNA, which is the DNA without heat treatment, would be eluted and moved towards the center of the substrate and such movement became significant after approximately 300 seconds, whereas denatured DNA, which is the DNA being heated and cooled rapidly, would remain attached to the periphery of the substrate. Under the same condition, small molecular probes, whether undergoing heat treatment or not, would either be washed away rapidly or be immobilized on the periphery of the substrate when eluted by 0.1× SSC in combination with appropriate anionic surfactant concentrations.

EXAMPLE 5

Figure 7:
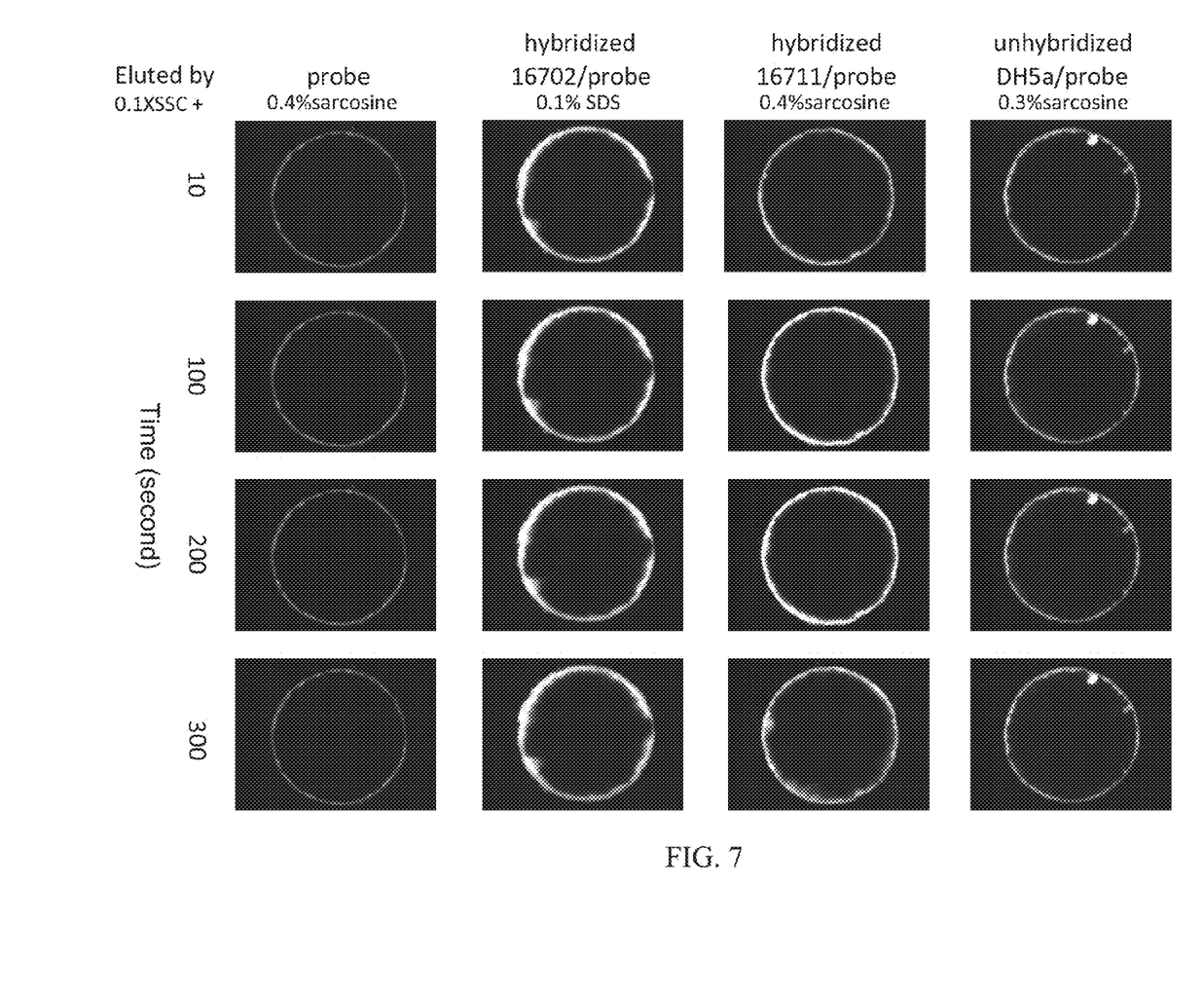
FIG. 7, result of eluting a hybridized test DNA and probe by the mixture of mixing sacrosine or SDS with SSC, respectively.

Analysis of Elution of Test DNA Hybridized with Probe Using a Mixture of Sacrosine and SSC, or a Mixture of SDS and SSC FIG. 7 clearly illustrates the results upon the probes was injected and was eluted using 0.1× SSC and 0.4% (w/v) sarcosine; hybridized E. tarda BCRC16702 DNA/probe was injected and was eluted using 0.1× SSC and 0.1% (w/v) SDS; hybridized E. tarda BCRC16711 DNA/probe was injected and was eluted using 0.1× SSC and 0.4% (w/v) sarcosine; unhybridized E. coli DH5α/probe was injected and was eluted using 0.1× SSC and 0.3% (w/v) sarcosine. From the result of comparison of native and denatured DNA in Example 4, it is known that when hybridization is cooled at room temperature, DNA hybridized with probe molecules should be in the state between the native state and the denatured state. If the state of hybridization was similar to the native state, DNA would move towards the center of the substrate, however, would not be visible since the DNA in this embodiment were not stained by SYBR® Green I. If the state of hybridization was similar to the denatured state, DNA would remain attached to the periphery of the substrate, yet, would not be visible without staining. In addition, the probe was immobile and remained attached to the periphery of the substrate. As a result, only the test DNA hybridized with the florescence-labeled probe can be seen; thus, the images of florescence moving towards the center of the substrate indicate the molecule of test DNA hybridized with the probe.

Results indicated that micelles were formed by an anionic surfactant and test nucleic acid/probe. The structure of the micelle is shown in FIG. 10. When the anionic surfactant was SDS, the hydrophobic end (C12) of SDS coated the test nucleic acid/probe, while the negatively charged group of the hydrophilic end of SDS coupled with the positive charges on the substrate. When the anionic surfactant was sarcosine, the hydrophobic end (C14) of sarcosine coated the test nucleic acid/probe, while the negatively charged group of the hydrophilic end of sarcosine coupled with the positive charges on the substrate. According to the result of the present embodiment, movement of fluorescence towards the center of the substrate can be observed with the hybridized probe ET996/DNA of 16720 or the hybridized probe ET996/DNA of 16711, but cannot be seen with unhybridized probe ET996/DH5α.

COMPARATIVE EXAMPLE 1

Analysis of Elution of Test Double Helix DNA/Syber Using SSC

Figure 8:
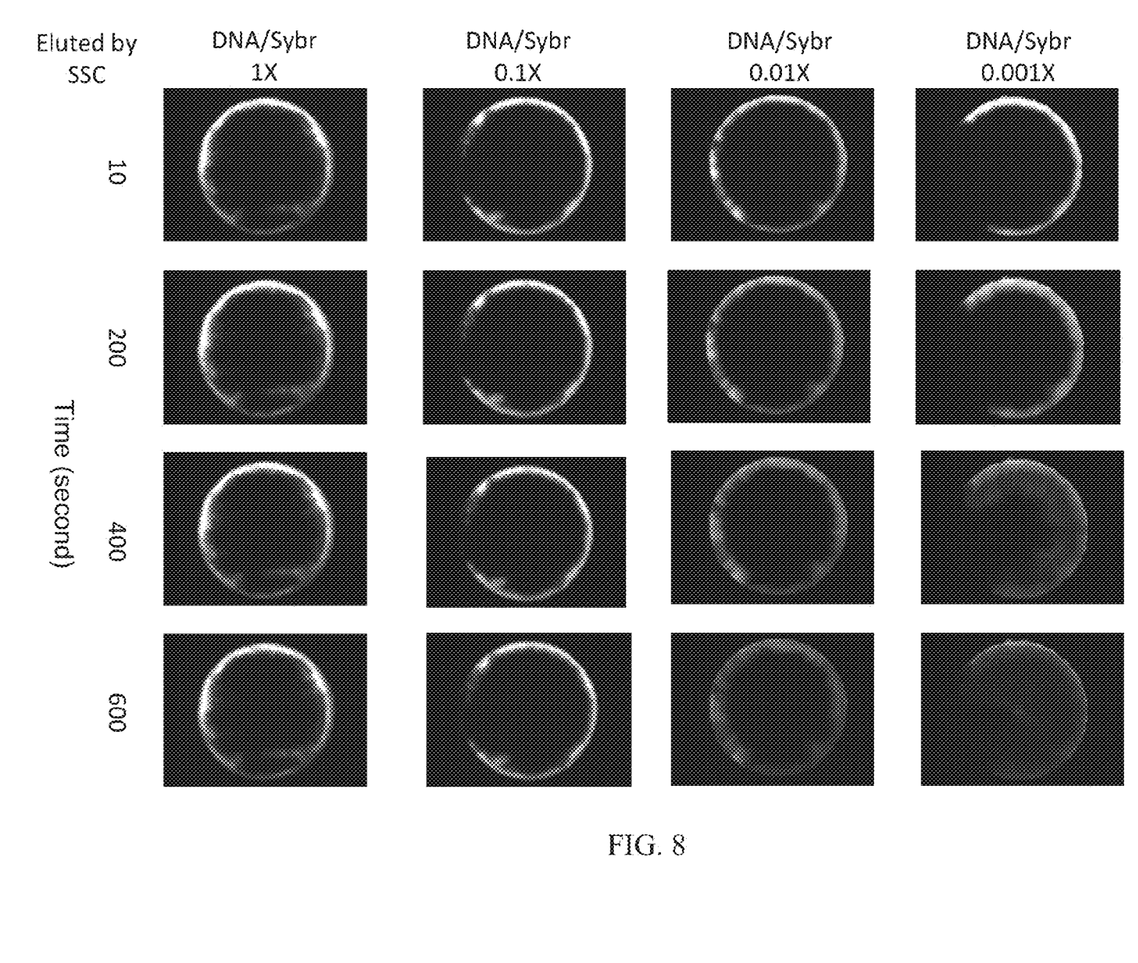
FIG. 8, result of eluting a test double-stranded DNA/Syber by SSC.

FIG. 8 clearly illustrates the results upon the mixture of test double helix DNA, which is bound to SYBR® Green I stain and abbreviated as DNA/Sybr, were injected, and different concentrations of diluted SSC were used for elution without any anionic surfactant. The SSC solution was diluted 0.001×, 0.01×, 0.1× and 1×. Results indicate that, when eluted using 0.1× or above diluted SSC solution, macromolecular test DNA would not be eluted to the center of the substrate. However, when eluted using 0.01× or 0.001× diluted SSC solution, macromolecular test DNA would be eluted to the center of the substrate.

COMPARATIVE EXAMPLE 2

Analysis of Elution of Probe/HEX Using SSC

Figure 9:
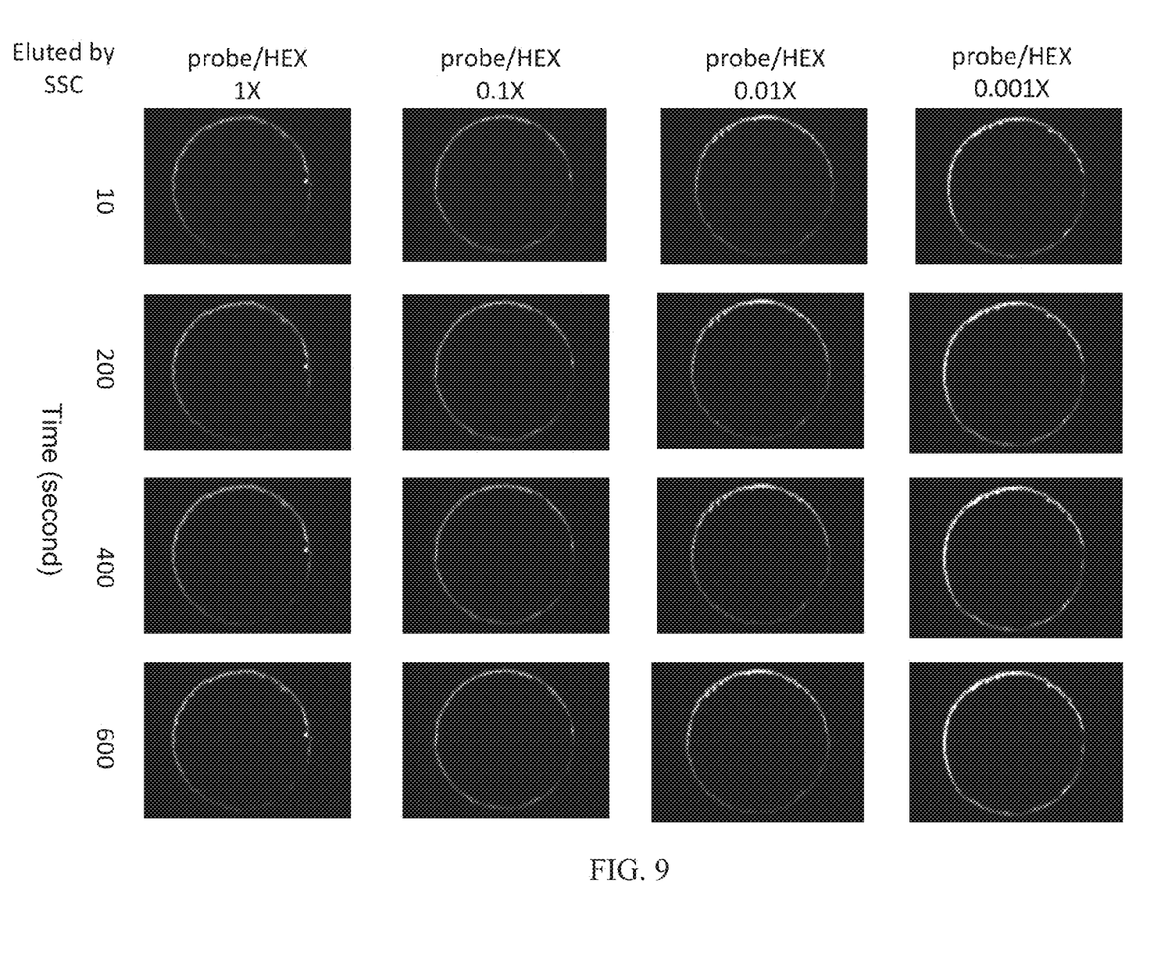
FIG. 9, result of eluting a probe/HEX by SSC.

FIG. 9 clearly illustrates the results upon the mixture of probe/HEX were injected, and different concentrations of diluted SSC were used for elution without any anionic surfactant. The SSC solution was diluted 0.001×, 0.01×, 0.1× and 1×. It is shown that, according to Table 1, neither low concentration (0.001× diluted) nor high concentration (5× diluted) of SSC solution can successfully washed away small molecular probes that were trapped at the periphery of the substrate during the elution.

TABLE 1

Elution of substrate using SSC[1]

| | Concentration of SSC | | | | | | | |
|---|---|---|---|---|---|---|---|---|
| | 5X | 4X | 3X | 2X | 1X | 0.1X | 0.01X | 0.001X |
| DNA | +[2] | + | + | + | + | + | −[3] | − |
| Probe | + | + | + | + | + | + | + | + |

[1]SSC: 20X SSC includes 3M sodium chloride and 0.3M sodium citrate (pH 7.0).
[2]"+": nucleic acids remain on the periphery of substrate after elution.
[3]"−": nucleic acids move towards the center of substrate and being washed away after elution.

Table 1, as well as FIG. 8 and FIG. 9 show that elution using SSC solution can be an optional step, particularly, the 0.1× diluted SSC solution, since it does not affect the movement of the double helix macromolecular DNA and the small molecular probe which are firmly trapped and bound to the substrate. The purpose of SSC solution is not to move nucleic acid molecules but to provide anions that couple with the positive charges on the substrate. Therefore, under 0.1× diluted SSC solution, whether or not the macromolecular test DNA/Syber and the probe/HEX being washed away from the substrate is confirmed to be determined by the concentration of an anionic surfactant in the present invention.

According to the experimental results shown in the Figures of the present invention, since nucleic acid probe can be hybridized with E. tarda DNA, when the mixture is injected into the hybridization region of the microfluidic chip, the E. tarda DNA hybridized with nucleic acid probe (fluorescence-labeled) are soon blocked and attached to the periphery of the substrate. In addition, unhybridized nucleic acid probes are also stocked in the pores of the substrate. Therefore, fluorescence signals can be seen in the periphery of the substrate prior to elution. However, only once elution using anionic surfactant with specific range of concentrations is required to wash away the unhybridized nucleic acid probes. Furthermore, the present invention discovers that E. tarda DNA hybridized with the nucleic acid probe (fluorescence-labeled) can be washed away rapidly, in another word, move towards the center of the substrate. Thus, the method of the present invention can indeed identify the test DNA hybridized with nucleic acid probe, and, moreover, determine whether the test DNA contains a target sequence.

In addition, as shown in control groups, E. coli DNA cannot be hybridized with the nucleic acid probe and only the DNA that is able to be hybridized with fluorescence-labeled probe can be visible. Hence, the fluorescence images of the moving molecules are DNA hybridized probe molecules but not ET996/DH5α molecules. This result indicates the feasibility of the method of the present invention since the false-positive situation is eliminated.

What is claimed is:

1. A method of using a microfluidic chip for nucleic acid hybridization, comprising providing the microfluidic chip having a hybridization region installed with a porous substrate, an interstice being defined between the porous substrate and a sidewall of the hybridization region and surrounding the periphery of the porous substrate, the hybridization region being connected to at least one inlet and at least one outlet, respectively; the method includes the following steps:

(a) mixing a test nucleic acid without a heat treatment and a marker-labeled nucleic acid probe to form a mixed solution, injecting the mixed solution into the microfluidic chip via the at least one inlet to fill the interstice between the porous substrate and the sidewall of the hybridization region for maintaining the test nucleic acid that hybridized to the marker-labeled nucleic acid probe being absorbed to the periphery of the porous substrate;

(b) continuously injecting of an anionic surfactant, wherein the anionic surfactant is sodium dodecyl sulfate having a concentration ranged from 0.1% to 0.3% (w/v) or sarcosine having a concentration ranged from 0.3% to 0.4% (w/v), the anionic surfactant entering the interstice surrounding the periphery of the porous substrate via the at least one inlet and then flowing through the porous substrate from the periphery of the porous substrate toward the center of the porous substrate, the anionic surfactant being finally discharged via the at least one outlet; wherein injecting a buffer solution into the microfluidic chip prior to step (a) to activate the porous substrate with positive charges, to allow the test nucleic acid hybridized with the marker-labeled nucleic acid probe to form a micelle during washing with the anionic surfactant in step (b); and (c) detecting where there is specific hybridization of the test nucleic acid with the marker-labeled nucleic acid probe on the porous substrate after washing with the anionic surfactant within 400 seconds based on a movement of the test nucleic acid hybridized with the marker-labeled nucleic acid probe from the periphery of the porous substrate to the center of the porous substrate.

2. The method according to claim 1, wherein hydrophobic tails of the anionic surfactant coats the test nucleic acid and the marker-labeled nucleic acid probe, while hydrophilic head groups of the anionic surfactant having negative charges couples to the positive charges on the porous substrate.

3. The method according to claim 1, further comprising a salt solution with low concentration is selectively added while injecting the anionic surfactant in step (b).

4. The method according to claim 3, wherein the salt solution with low concentration is standard sodium citrate.

5. The method according to claim 4, the concentration of the standard sodium citrate is a dilution from 0.001× to 5×.

6. The method according to claim 1, wherein the marker is a fluorescence marker.

7. The method according to claim 1, wherein the buffer solution is a Tris-EDTA buffer solution.

* * * * *